Figure 1:
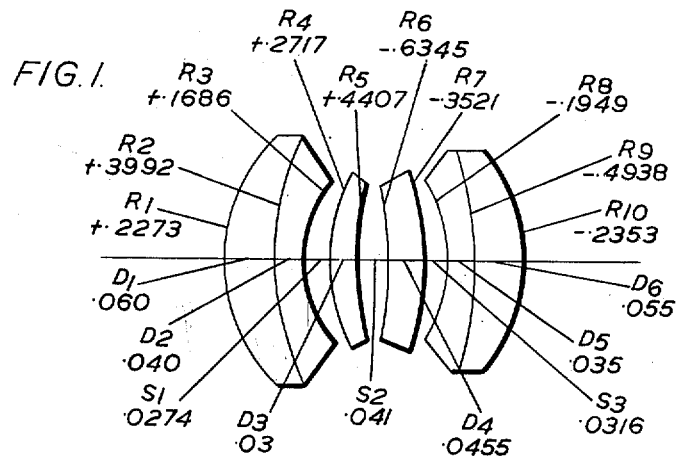

June 24, 1952  G. H. COOK  2,601,595
FOUR COMPONENT OPTICAL OBJECTIVE
Filed March 13, 1951  2 SHEETS—SHEET 1

Inventor
GORDON H. COOK

By Emery, Holcombe a Blair
Attorney

June 24, 1952  G. H. COOK  2,601,595
FOUR COMPONENT OPTICAL OBJECTIVE
Filed March 13, 1951  2 SHEETS—SHEET 2
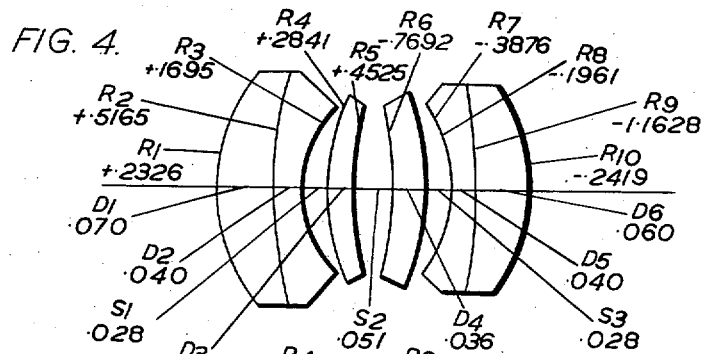
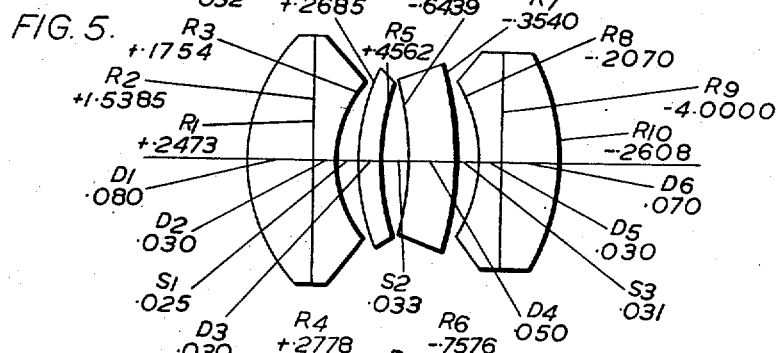
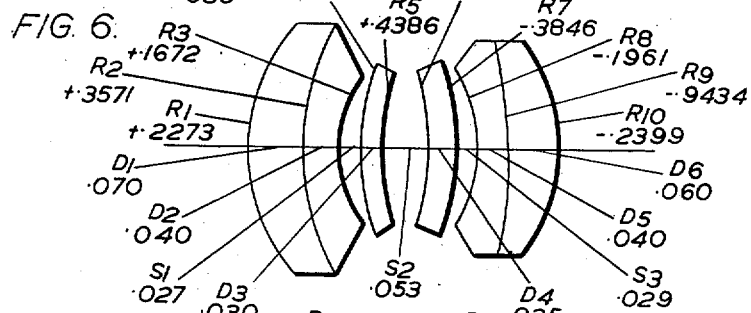
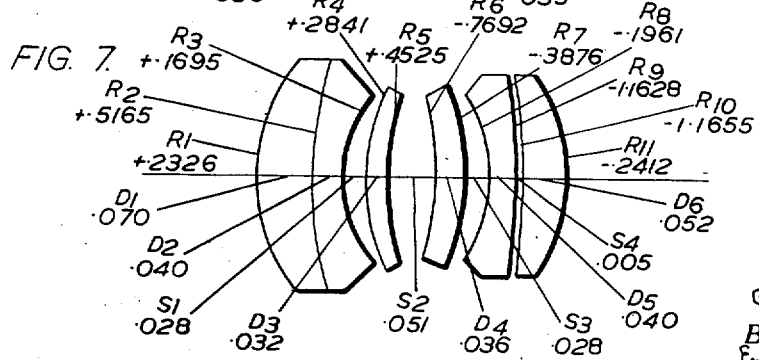
Inventor
GORDON H. COOK
By Emery, Holcombe a Blair
Attorney Patented June 24, 1952

2,601,595

UNITED STATES PATENT OFFICE 2,601,595

FOUR COMPONENT OPTICAL OBJECTIVE

Gordon Henry Cook, Leicester, England, assignor to Taylor, Taylor & Hobson Limited, Leicester, England, a British company Application March 13, 1951, Serial No. 215,255
In Great Britain February 15, 1951

17 Claims. (Cl. 88—57)

This invention relates to an optical objective, more especially for photographic purposes, corrected for spherical and chromatic aberrations, coma, astigmatism, field curvature and distortion, and comprising two simple convergent components located between two divergent doublet components each consisting of a convergent element and a divergent element, all four components being of meniscus form with their air-exposed surfaces concave towards a diaphragm between the two simple components, the divergent element in each compound component being on the side nearer to the diaphragm.

The invention of the present applicant's co-pending application of the United States of America No. 214,508, filed March 8, 1951, is concerned with a well-corrected objective of this type having a high relative aperture and wide covering power and also having improved correction for zonal spherical aberration and oblique spherical aberration, such invention having the further advantage that it makes it possible to have diameters larger than are needed for the axial beam alone in order to avoid the vignetting which would otherwise be objectionable with the wide angular field covered.

In the objective according to such copending application, as also in the objective according to the present application, the arithmetic mean between the curvatures of the internal contacts in the doublet outer components (a curvature being reckoned for this purpose as positive when the internal contact is concave towards the diaphragm) is less than 3.5 times the equivalent power of the objective and is greater than $2(10x-1)/(10x+1)$ times such equivalent power, where $x$ is the positive value of the difference between the arithmetic mean of the mean refractive indices of the materials of the convergent elements of the doublet components and the arithmetic mean of the mean refractive indices of the materials of the divergent elements of such components.

The term "internal contacts" is used herein, in order to avoid the ambiguity and confusion inherent in the use of the terms "internal contact surface" and "internal contact surfaces" more usually employed hitherto, and indicates the assemblage of two cooperating surfaces in a compound component, whether such surfaces are cemented together or are in the form of a "broken contact," that is when the two cooperating surfaces have slightly different curvatures, such difference being less than 0.2 times the equivalent power of the objective, whilst the axial separation (if any) of the two surfaces is less than .01 times the equivalent focal length of the objective. The radius of curvature of an internal contact is the actual radius of curvature of the surface in the case of a cemented contact or the harmonic mean between the radii of curvature of the two surfaces in the case of a broken contact.

The invention of such copending application is concerned more especially with an objective corrected to cover a semiangular field greater than 30 degrees, but the present application relates to a modification of such invention to give a higher degree of correction for the various aberrations but with a smaller covering power.

In this modification according to the present invention, the objective corrected to cover a semi-angular field not greater than 30 degrees has Petzval curvature between .08 and .16 times the equivalent optical power of the objective, the term Petzval curvature being used in its usual significance to denote the sum for all the surfaces of the objective of the product of the curvature of a surface and the difference between the reciprocals of the mean refractive indices of the materials in front of and behind the surface, such difference being reckoned as positive if the material behind the surface has greater index than that in front of the surface, whilst the curvature is for this purpose reckoned as positive if the surface is convex to the front in accordance with the usual convention. Expressed mathematically, the Petzval curvature is defined by the expression $\Sigma(N^1-N)/N^1.N.R$, where $N^1$ and $N$ are respectively the mean refractive indices of the materials behind and in front of the surface and $R$ is the radius of curvature of the surface, the symbol $\Sigma$ indicating the sum of the values of the following expression for all the surfaces of the objective. The terms "front" and "rear" are used herein in accordance with the usual convention to denote the sides of the objective respectively nearer to and further from the longer conjugate.

The arithmetic mean between the axial thicknesses of the two doublet components preferably lies between .075 F and .15 F where F is the equivalent focal length of the objective. The arithmetic mean between the positive values of the radii of curvature of the outer surfaces of the simple inner components preferably lies between .22 F and .44 F. The arithmetic mean between the positive values of the radii of curvature of the inner air-exposed surfaces of the two doublet components preferably lies between .11 F and .25 F. The arithmetic mean between the positive values of the radii of curvature of the outer air-exposed surfaces of the two doublet components preferably lies between .17 F and .30 F.

Since the expression $2(10x-1)/(10x+1)$, referred to above, can be negative, the invention does not preclude the possibility of having the internal contacts in the doublet components convex towards the diaphragm, but this is only permissible provided that the refractive index differences between the convergent and divergent elements of the doublet components are small. On the other hand, since $x$ is positive, such expression cannot exceed +2, and consequently, if the internal contacts are fairly strongly concave towards the diaphragm, there is wide freedom of choice of the indices.

In one group of practical embodiments of the invention, $x$ as above defined is less than .025, and the arithmetic mean between the mean refractive indices of the materials of the two simple components lies between 1.60 and 1.80.

In another group of embodiments of the invention, $x$ is greater than .025 and the arithmetic mean between the mean refractive indices of the materials of the two simple components lies between 1.55 and 1.68, the arithmetic mean between the mean refractive indices of the materials of the convergent elements of the two doublet components being greater than that of the divergent elements in such components.

Figure 2:
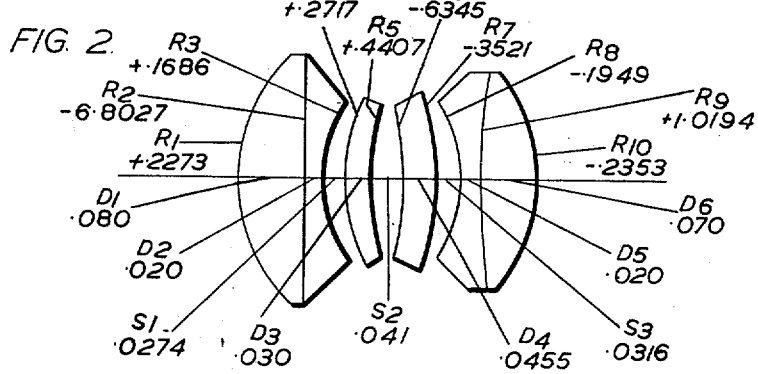
Figure 3:
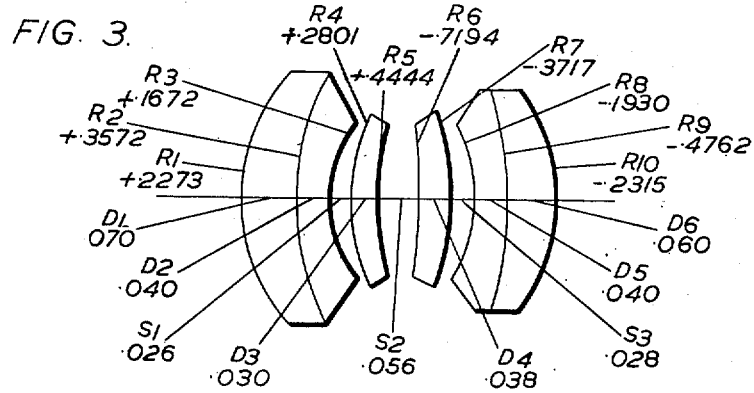

Figures 1-7 of the accompanying drawings respectively illustrate seven convenient practical examples of objective according to the invention and numerical data for these examples are given in the following tables, in which $R_1 R_2 \ldots$ represent the radii of curvature of the individual surfaces of the objective, the positive sign indicating that the surface is convex to the front and the negative sign that it is concave thereto, $D_1 D_2 \ldots$ represent the axial thicknesses of the various elements, and $S_1 S_2 S_3$ represent the axial air separations between the components. The tables also give the mean refractive indices $n_D$ for the D-line of the spectrum and the Abbé V numbers of the materials of the various elements.

Example I

Equivalent focal length 1.000. Relative Aperture F/4

| Radius | Thickness or Air Separation | Refractive Index $n_D$ | Abbé V Number |
|---|---|---|---|
| $R_1 = +.2273$ | $D_1 = .060$ | 1.700 | 41.2 |
| $R_2 = +.3992$ | $D_2 = .040$ | 1.700 | 30.3 |
| $R_3 = +.1686$ | $S_1 = .0274$ | | |
| $R_4 = +.2717$ | $D_3 = .03$ | 1.691 | 54.8 |
| $R_5 = +.4407$ | $S_2 = .041$ | | |
| $R_6 = -.6345$ | $D_4 = .0455$ | 1.691 | 54.8 |
| $R_7 = -.3521$ | $S_3 = .0316$ | | |
| $R_8 = -.1949$ | $D_5 = .035$ | 1.700 | 30.3 |
| $R_9 = -.4938$ | $D_6 = .055$ | 1.700 | 41.2 |
| $R_{10} = -.2353$ | | | |

Example II

Equivalent focal length 1.000. Relative Aperture F/4

| Radius | Thickness or Air Separation | Refractive Index $n_D$ | Abbé V Number |
|---|---|---|---|
| $R_1 = +.2273$ | $D_1 = .080$ | 1.700 | 53.0 |
| $R_2 = -6.8027$ | $D_2 = .020$ | 1.700 | 41.2 |
| $R_3 = +.1686$ | $S_1 = .0274$ | | |
| $R_4 = +.2717$ | $D_3 = .030$ | 1.691 | 41.2 |
| $R_5 = +.4407$ | $S_2 = .041$ | | |
| $R_6 = -.6345$ | $D_4 = .0455$ | 1.691 | 41.2 |
| $R_7 = -.3521$ | $S_3 = .0316$ | | |
| $R_8 = -.1949$ | $D_5 = .020$ | 1.700 | 41.2 |
| $R_9 = +1.0194$ | $D_6 = .070$ | 1.700 | 53.0 |
| $R_{10} = -.2353$ | | | |

Example III

Equivalent focal length 1.000. Relative Aperture F/4

| Radius | Thickness or Air Separation | Refractive Index $n_D$ | Abbé V Number |
|---|---|---|---|
| $R_1 = +.2273$ | $D_1 = .070$ | 1.623 | 56.2 |
| $R_2 = +.3572$ | $D_2 = .040$ | 1.623 | 36.0 |
| $R_3 = +.1672$ | $S_1 = .026$ | | |
| $R_4 = +.2801$ | $D_3 = .030$ | 1.691 | 54.8 |
| $R_5 = +.4444$ | $S_2 = .056$ | | |
| $R_6 = -.7194$ | $D_4 = .038$ | 1.691 | 54.8 |
| $R_7 = -.3717$ | $S_3 = .028$ | | |
| $R_8 = -.1930$ | $D_5 = .040$ | 1.623 | 36.0 |
| $R_9 = -.4762$ | $D_6 = .060$ | 1.623 | 56.2 |
| $R_{10} = -.2315$ | | | |

In these three examples the diaphragm is located approximately midway between the surfaces $R_5$ and $R_6$, and the objective is corrected to cover a semi-angular field of 25 degrees in Example I, 25 degrees in Example II and 28 degrees in Example III. The Petzval curvature is .099 in Example I, .099 in Example II and .135 in Example III, times the equivalent power of the objective.

All three examples belong to the first of the two groups above mentioned, and since the materials of the convergent and divergent elements of the two doublet components have substantially the same mean refractive index, $x$ as above defined is zero, so that the expression $$2(10x-1)/(10x+1)$$

has the value $-2$ in each case. This permits, according to the invention a wide choice in the curvatures of the internal contacts $R_2$ and $R_9$. There is also available a wide choice of Abbé V numbers for the materials of all the elements. This considerably simplifies the problem of finding suitable materials for the elements and also greatly facilitates correction of the higher order chromatic errors.

Thus, in Example I the internal contacts $R_2$ and $R_9$ are both fairly strongly concave towards the diaphragm, whilst Example II is a modification of Example I, in which the internal contacts are slightly convex towards the diaphragm and in which a completely different series of Abbé V numbers is used. Example III again has its internal contacts fairly strongly concave to the diaphragm, but differs from Example I in having lower refractive indices in the doublet components and yet another different series of Abbé V numbers.

In Example I the curvatures of the internal contacts $R_2$ and $R_9$ are respectively $+2.5$ and $+2.0$, the positive sign in this case indicating that the surfaces are concave towards the diaphragm, and the arithmetic mean between them is thus $+2.25$. In Example II, the corresponding figures for the two curvatures are $-0.14$ and $-0.98$ giving an arithmetic mean $-0.56$, whilst in Example III the curvatures are $+2.8$ and $+2.1$ giving an arithmetic mean $+2.45$. These figures are in terms of the equivalent power of the objective.

The arithmetic mean between the axial thicknesses of the two doublets is .095 F in Examples I and II and .105 F in Example III, where F is the equivalent focal length of the objective. The arithmetic mean between the positive values of the radii of curvature of the outer surfaces $R_4$ and $R_7$ of the simple inner components is .3119 F in Examples I and II and .3259 F in Example III. The arithmetic mean between the positive values of the radii of curvature of the inner surfaces $R_3$ and $R_8$ of the doublet components is .1818 F in Examples I and II and .1801 F in Example III. The arithmetic mean of the positive values of the radii of curvature of the outer surfaces $R_1$ and $R_{10}$ of the doublet components is .2313 F in Examples I and II and .2294 F in Example III.

*Example IV*

Equivalent focal length 1.000. Relative Aperture F/3.5

| Radius | Thickness or Air Separation | Refractive Index $n_D$ | Abbé V Number |
|---|---|---|---|
| $R_1 = +.2326$ | | | |
| | $D_1 = .070$ | 1.6570 | 50.8 |
| $R_2 = +.5165$ | | | |
| | $D_2 = .040$ | 1.6205 | 36.2 |
| $R_3 = +.1695$ | | | |
| | $S_1 = .028$ | | |
| $R_4 = +.2841$ | | | |
| | $D_3 = .032$ | 1.6234 | 56.2 |
| $R_5 = +.4525$ | | | |
| | $S_2 = .051$ | | |
| $R_6 = -.7692$ | | | |
| | $D_4 = .036$ | 1.6234 | 56.2 |
| $R_7 = -.3876$ | | | |
| | $S_3 = .028$ | | |
| $R_8 = -.1961$ | | | |
| | $D_5 = .040$ | 1.6055 | 38.0 |
| $R_9 = -1.1628$ | | | |
| | $D_6 = .060$ | 1.6570 | 50.8 |
| $R_{10} = -.2419$ | | | |

*Example V*

Equivalent focal length 1.000. Relative Aperture F/4

| Radius | Thickness or Air Separation | Refractive Index $n_D$ | Abbé V Number |
|---|---|---|---|
| $R_1 = +.2473$ | | | |
| | $D_1 = .080$ | 1.7000 | 41.2 |
| $R_2 = +1.5385$ | | | |
| | $D_2 = .030$ | 1.6480 | 33.8 |
| $R_3 = +.1754$ | | | |
| | $S_1 = .025$ | | |
| $R_4 = +.2685$ | | | |
| | $D_3 = .030$ | 1.5887 | 61.2 |
| $R_5 = +.4562$ | | | |
| | $S_2 = .033$ | | |
| $R_6 = -.6439$ | | | |
| | $D_4 = .050$ | 1.5887 | 61.2 |
| $R_7 = -.3540$ | | | |
| | $S_3 = .031$ | | |
| $R_8 = -.2070$ | | | |
| | $D_5 = .030$ | 1.6480 | 33.8 |
| $R_9 = -4.0000$ | | | |
| | $D_6 = .070$ | 1.7000 | 41.2 |
| $R_{10} = -.2608$ | | | |

In these two examples the diaphragm is located approximately midway between the surfaces $R_5$ and $R_6$, and the objective is in each case corrected to cover a semi-angular field of 25 degrees. The Petzval curvature in Example IV is .114 and in Example V .126 times the equivalent power of the objective.

These two examples belong to the second of the two groups, wherein $x$ as above defined is greater than .025. In Example IV, $x$ is .044 and the expression $2(10x-1)/(10x+1)$ works out as $-.81$, the corresponding figures for Example V being .052 and $-.63$. In Example IV the curvatures of the internal contacts $R_2$ and $R_9$, in terms of the equivalent power of the objective, are respectively $+1.94$ and $+.86$, the contacts both being concave to the diaphragm, and the arithmetic mean between them is thus $+1.40$. The corresponding figures for Example V are respectively $+.65$ and $+.25$ giving a mean $+.45$.

The arithmetic mean between the axial thicknesses of the two doublets is .105 F in both examples. The arithmetic mean between the positive values of the radii of curvature of the outer surfaces $R_4$ and $R_7$ of the simple inner components is .3358 F in Example IV and .3112 F in Example V. The arithmetic mean between the positive values of the radii of curvature of the inner surfaces $R_3$ and $R_8$ of the doublet components is .1828 F in Example IV and .1912 F in Example V. The arithmetic mean between the positive values of the radii of curvature of the outer surfaces $R_1$ and $R_{10}$ of the doublet components is .2372 F in Example IV and .2540 F in Example V.

In all the foregoing examples, the two halves of the objective are nearly symmetrical with one another, but this is not essential to the invention, and various combinations of one half of one example with one half of another example, with relatively slight consequential alterations of some of the dimensions, are possible within the scope of the invention. Again, it is sometimes possible to modify such variants further by interchanging the refractive indices of two corresponding elements, one in each half.

Thus the following table gives, by way of example, one such variant, in which the front half closely resembles that of Example III and the rear half that of Example IV.

*Example VI*

Equivalent focal length 1.000. Relative Aperture F/4

| Radius | Thickness or Air Separation | Refractive Index $n_D$ | Abbé V Number |
|---|---|---|---|
| $R_1 = +.2273$ | | | |
| | $D_1 = .070$ | 1.6230 | 56.2 |
| $R_2 = +.3571$ | | | |
| | $D_2 = .040$ | 1.6230 | 36.9 |
| $R_3 = +.1672$ | | | |
| | $S_1 = .027$ | | |
| $R_4 = +.2778$ | | | |
| | $D_3 = .030$ | 1.6910 | 54.8 |
| $R_5 = +.4386$ | | | |
| | $S_2 = .053$ | | |
| $R_6 = -.7576$ | | | |
| | $D_4 = .035$ | 1.6234 | 56.2 |
| $R_7 = -.3846$ | | | |
| | $S_3 = .029$ | | |
| $R_8 = -.1961$ | | | |
| | $D_5 = .040$ | 1.6132 | 36.9 |
| $R_9 = -.9434$ | | | |
| | $D_6 = .060$ | 1.6570 | 50.8 |
| $R_{10} = -.2399$ | | | |

The diaphragm in this example is again approximately midway between the surfaces $R_5$ and $R_6$, and the objective is corrected to cover a semi-angular field of 25 degrees. The Petzval curvature is .121 times the equivalent power of the objective.

In this example, $x$ as above defined has the value .0219 and the expression $$2(10x-1)/(10x+1)$$

has the value $-1.28$. This example thus lies in the first of the above two groups. The curvatures of the internal contacts $R_2$ and $R_9$ are respectively $+2.8$ and $+1.1$ times the equivalent power of the objective, the arithmetic mean being $+1.9$ times such power.

The arithmetic mean between the axial thicknesses of the two doublet components is .105 F. The arithmetic means between the positive values of the radii of curvature of the surfaces $R_4$ and $R_7$, the surfaces $R_3$ and $R_8$, and the surfaces $R_1$ and $R_{10}$ are respectively .3312 F, .1816 F and .2336 F.

In all the foregoing examples, the internal contacts are cemented, but as has already been mentioned, this is not essential to the invention, and either or both of the internal contacts may be in the form of broken contacts. As one example of this, the following table shows a variant of Example IV, in which the internal contact in the rear doublet component is a broken contact, that in the front doublet component being cemented.

*Example VII*

| Equivalent focal length 1.000. Relative Aperture F/3.5 | | | |
|---|---|---|---|
| Radius | Thickness or Air Separation | Refractive Index $n_D$ | Abbé V Number |
| $R_1 = +.2326$ | $D_1 = .070$ | 1.6570 | 50.8 |
| $R_2 = +.5165$ | $D_2 = .040$ | 1.6205 | 36.2 |
| $R_3 = +.1695$ | $S_1 = .028$ | | |
| $R_4 = +.2841$ | $D_3 = .032$ | 1.6234 | 56.2 |
| $R_5 = +.4525$ | $S_2 = .051$ | | |
| $R_6 = -.7692$ | $D_4 = .036$ | 1.6234 | 56.2 |
| $R_7 = -.3876$ | $S_3 = .028$ | | |
| $R_8 = -.1961$ | $D_5 = .040$ | 1.6055 | 38.0 |
| $R_9 = -1.1628$ | $S_4 = .005$ | | |
| $R_{10} = -1.1655$ | $D_6 = .052$ | 1.6570 | 50.8 |
| $R_{11} = -.2412$ | | | |

The diaphragm in this example is approximately midway between the surface $R_5$ and $R_6$, and the objective is corrected for a semi-angular field of 25 degrees. The Petzval curvature of the objective is .120 times the equivalent power of the objective.

In this example $x$ has the value .044 and the expression $2(10x-1)/(10x+1)$ the value $-.81$. The curvature of the cemented contact $R_2$ is $+1.94$ times the equivalent power of the objective, whilst that of the broken contact $R_9$ $R_{10}$ is the mean of the two individual curvatures is $+.86$ times such power, so that the arithmetic mean between them is $+1.40$ times such power.

The arithmetic mean between the axial thicknesses of the two doublet components is .105 F. The arithmetic means between the positive values of the radii of curvature of the surfaces $R_4$ and $R_7$, the surfaces $R_3$ and $R_8$ and the surfaces $R_1$ and $R_{11}$ are respectively .3358 F, .1828 F and .2369 F.

In all the examples, the improvements according to the invention make it possible to have larger diameters for the various elements than is required for the axial beam alone, and such larger diameters are very valuable in facilitating correction for oblique aberrations. Thus in Examples I, II, III, V and VI, the diameters of the various surfaces may be .32 F for $R_1$ and $R_2$, .2 F for the chamfer diameters of $R_3$ $R_5$ $R_6$ and $R_8$, and .28 F for $R_9$ and $R_{10}$. In Examples IV and VII, the diameters may be .30 F for $R_1$ and $R_2$, .22 F for the chamfers of $R_3$ $R_5$ $R_6$ and $R_8$, and .26 F for $R_9$ and $R_{10}$ (Example IV) or for $R_9$ $R_{10}$ and $R_{11}$ (Example VII).

The insertion of equals $(=)$ signs in the radius columns of the tables, in company with plus $(+)$ and minus $(-)$ signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radious indicated for example as positive in the tables may have to be treated as negative for some calculations as is well understood in the art.

What I claim as my invention and desire to secure by Letters Patent is:

1. An optical objective, corrected for spherical and chromatic aberrations, coma, astigmatism, field curvature and distortion, to cover a semi-angular field not greater than 30 degrees, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraicly less than $+3.5/F$ where F is the equivalent focal length of the objective and greater than $2(10x-1)/(10x+1)$ F, where $x$ is the positive value of the difference between the arithmetic mean of the mean refractive indices of the materials of the convergent elements of the two doublet components and the arithmetic mean of the mean refractive indices of the materials of the two divergent elements, the Petzval curvature as determined from the expression $\Sigma(N^1-N)/N^1.N.R$ having a value lying between .08/F and .16/F where the symbol $\Sigma$ indicates the sum of the values of the expression following it for all the surfaces of the objective and $N^1$ and $N$ are the mean refractive indices of the materials respectively behind and in front of the surface while R is the radius of curvature of the surface and for this purpose is reckoned as positive when the surface is convex towards the front of the objective.

2. An optical objective as claimed in claim 1, in which the arithmetic mean of the axial thicknesses of the two doublet components lies between .075 F and .16 F.

3. An optical objective as claimed in claim 2, in which the arithmetic mean of the positive values of the radii of curvature of the outer surfaces of the simple inner components lies between .22 F and .44 F.

4. An optical objective as claimed in claim 3, in which the arithmetic mean of the positive values of the radii of curvature of the innermost surfaces of the doublet components lies between .11 F and .25 F, and that of the outermost surfaces of the doublet components lies between .17 F and .30 F.

5. An optical objective as claimed in claim 1, in which the arithmetic mean of the positive values of the radii of curvature of the outer surfaces of the simple inner components lies between .22 F and .44 F.

6. An optical objective as claimed in claim 1, in which the arithmetic mean of the positive values of the radii of curvature of the innermost surfaces of the doublet components lies between .11 F and .25 F.

7. An optical objective as claimed in claim 1, in which the arithmetic mean of the positive values of the radii of curvature of the outermost surfaces of the doublet components lies between .17 F and .30 F.

8. An optical objective, corrected for spherical and chromatic aberrations, coma, astigmatism, field curvature and distortion, to cover a semi-angular field not greater than 30 degrees, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraicly less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic mean of the mean refractive indices of the materials of the two divergent elements, the Petzval curvature as determined from the expression $\Sigma(N^1-N)/N^1.N.R$ having a value lying between .08/F and .16/F where the symbol $\Sigma$ indicates the sum of the values of the expression following it for all the surfaces of the objective and $N^1$ and N are the mean refractive indices of the materials respectively behind and in front of the surface while R is the radius of curvature of the surface and for this purpose is reckoned as positive when the surface is convex towards the front of the objective, the said difference $x$ being less than .025 while the arithmetic mean of the mean refractive indices of the materials of the two simple components lies between 1.60 and 1.80.

9. An optical objective as claimed in claim 8, in which the arithmetic mean of the axial thicknesses of the two doublet components lies between .075 F and .16 F.

10. An optical objective as claimed in claim 8, in which the arithmetic mean of the positive values of the radii of curvature of the outer surfaces of the simple inner components lies between .22 F and .44 F.

11. An optical objective as claimed in claim 8, in which the arithmetic mean of the positive values of the radii of curvature of the innermost surfaces of the doublet components lies between .11 F and .25 F.

12. An optical objective as claimed in claim 8, in which the arithmetic mean of the positive values of the radii of curvature of the outermost surfaces of the doublet components lies between .17 F and .30 F.

13. An optical objective, corrected for spherical and chromatic aberrations, coma, astigmatism, field curvature and distortion, to cover a semi-angular field not greater than 30 degrees, and comprising two doublet divergent outer components each having an outer convergent element and an inner divergent element, two simple convergent inner components located between such outer components, and a diaphragm located between the two inner components, said components and diaphragm being air spaced in axial alinement and all four components being of meniscus form with their air-exposed surfaces concave towards the diaphragm, the arithmetic mean of the curvatures of the internal contacts in the doublet components (a curvature being reckoned for this purpose as positive when the internal contact is concave towards the diaphragm) being algebraicly less than $+3.5/F$ where F is the equivalent focal length of the objective and greater than $2(10x-1)/(10x+1)F$, where $x$ is the positive value of the difference between the arithmetic mean of the mean refractive indices of the materials of the convergent elements of the two doublet components and the arithmetic mean of the mean refractive indices of the materials of the two divergent elements, the Petzval curvature as determined from the expression $\Sigma(N^1-N)/N^1.N.R$ having a value lying between .08/F and .16/F where the symbol $\Sigma$ indicates the sum of the values of the expression following it for all the surfaces of the objective and $N^1$ and N are the mean refractive indices of the materials respectively behind and in front of the surface while R is the radius of curvature of the surface and for this purpose is reckoned as positive when the surface is convex towards the front of the objective, the said difference $x$ being greater than .025 while the arithmetic mean of the mean refractive indices of the materials of the two simple components lies between 1.55 and 1.68 and the arithmetic mean of the mean refractive indices of the materials of the convergent elements of the two doublet components is greater than that of the divergent elements in such components.

14. An optical objective as claimed in claim 13, in which the arithmetic mean of the axial thicknesses of the two doublet components lies between .075 F and .16 F.

15. An optical objective as claimed in claim 13, in which the arithmetic mean of the positive values of the radii of curvature of the outer surfaces of the simple inner components lies between .22 F and .44 F.

16. An optical objective as claimed in claim 13, in which the arithmetic mean of the positive values of the radii of curvature of the innermost surfaces of the doublet components lies between .11 F and .25 F.

17. An optical objective as claimed in claim 13, in which the arithmetic mean of the positive values of the radii of curvature of the outermost surfaces of the doublet components lies between .17 F and .30 F.

GORDON HENRY COOK.

REFERENCES CITED

The following references are of record in the file of this patent:

UNITED STATES PATENTS

| Number | Name | Date |
|---|---|---|
| 1,792,917 | Merte | Feb. 17, 1931 |

FOREIGN PATENTS

| Number | Country | Date |
|---|---|---|
| 135,853 | Great Britain | Nov. 26, 1919 |
| 278,338 | Great Britain | Dec. 8, 1927 |
| 295,519 | Great Britain | Aug. 16, 1928 |
| 547,739 | Great Britain | Sept. 9, 1942 |
| 592,144 | Great Britain | Sept. 9, 1947 |